(12) United States Patent
Bauer et al.

(10) Patent No.: US 9,968,122 B1
(45) Date of Patent: May 15, 2018

(54) ASEPTIC METHOD OF PREPARING COCONUT WATER TO IMPROVE FLAVOR PROFILES AND RETAIN ORGANOLEPTIC PROPERTIES OF THE COCONUT WATER

(71) Applicant: HARMLESS HARVEST, INC., San Francisco, CA (US)

(72) Inventors: David Bauer, Oakland, CA (US); Mathieu Lostie, Bangkok (TH)

(73) Assignee: HARMLESS HARVEST, INC., San Francisco, CA (US)

( * ) Notice: Subject to any disclaimer, the term of this patent is extended or adjusted under 35 U.S.C. 154(b) by 0 days. days.

(21) Appl. No.: 15/449,046

(22) Filed: Mar. 3, 2017

Related U.S. Application Data

(60) Provisional application No. 62/302,992, filed on Mar. 3, 2016.

(51) Int. Cl.
| | |
|---|---|
| *B01D 61/00* | (2006.01) |
| *A23L 2/00* | (2006.01) |
| *A23L 1/28* | (2006.01) |
| *A23P 1/00* | (2006.01) |
| *A23L 5/20* | (2016.01) |
| *A23L 2/02* | (2006.01) |

(52) U.S. Cl.
CPC .................. *A23L 5/21* (2016.08); *A23L 2/02* (2013.01); *A23V 2002/00* (2013.01)

(58) Field of Classification Search
CPC ... B01D 61/18; A23L 2/52; A23L 2/38; A23L 2/02; A23L 1/28; A23L 2/00; A23P 1/00
USPC .................... 210/650; 426/51, 495, 590, 599
See application file for complete search history.

(56) References Cited

U.S. PATENT DOCUMENTS

| | | | |
|---|---|---|---|
| 3,899,606 A * | 8/1975 | Forkner | A21D 2/364 |
| | | | 426/250 |
| 2012/0135124 A1* | 5/2012 | Letourneau | A23L 2/02 |
| | | | 426/599 |
| 2014/0018285 A1* | 1/2014 | D'Amico | C11B 5/0078 |
| | | | 512/4 |
| 2016/0185474 A1* | 6/2016 | Bronner | A23L 2/42 |
| | | | 53/425 |
| 2016/0366917 A1* | 12/2016 | Zandhuis | A23L 2/02 |

OTHER PUBLICATIONS

Alexia Prades et al, "Coconut water preservation and processing: a review", Fruits, 2012, vol. 67, p. 157-171, 2012.*

* cited by examiner

*Primary Examiner* — Ana Fortuna
(74) *Attorney, Agent, or Firm* — Hogan Lovells US LLP

(57) ABSTRACT

An aseptic method of preparing coconut water to improve flavor profiles and retain organoleptic properties of the coconut water is provided, as well as the coconut water obtained through this process.

7 Claims, No Drawings

US 9,968,122 B1

ASEPTIC METHOD OF PREPARING COCONUT WATER TO IMPROVE FLAVOR PROFILES AND RETAIN ORGANOLEPTIC PROPERTIES OF THE COCONUT WATER

BACKGROUND OF THE INVENTION

There is a need for a method of preparing coconut water that sterilizes coconut water and yet maintains its flavor and nutrition. Coconut water contains many electrolytes and enzymes and has a complex flavor profile. Sterilization methods that use high heat for long periods of time destroy the nutritional benefits of coconut water and also alter the taste. Other methods of sterilization using filters, and maintaining the coconut water at a chilled temperature also negatively alters the taste of the coconut water. There thus remains a need for a method to provide a stable and yet safe and sterile coconut water that still tastes natural and fresh. The invention meets this need.

SUMMARY OF THE INVENTION

The inventions described herein provide a method of preparing coconut water that removes *Clostridium botulinum* (*C. botulinum*) spores and retains the flavor of natural unprocessed coconut water. The method comprises heating coconut water to a temperature of about 50° C. to about 100° C. while filtering through two micro filters in series having a pore size of about 0.2 microns to remove *C. botulinum* spores and retain coconut water flavor. In certain embodiments the coconut water is heated to a temperature of about 67-73° C., and in certain embodiments the coconut water is heated to a temperature of about 73° C. Preferably the coconut water is heated only for about 1 to 2 minutes at these temperatures as this allows the water to maintain its flavor and, in combination with the microfiltration, removes the *C. botulinum* spores. The methods of the invention provide an effective microbial removal of pathogenic and non-pathogenic vegetative cells and spores. The effective ultra-filtration sterilization treatment minimizes any risk of spoilage (including that by *C. botulinum*) when loss of bottled coconut water refrigeration (and subsequent loss in chilled product temperature) might occur.

The invention also provides coconut water obtained by the methods of the invention.

DETAILED DESCRIPTION OF THE INVENTION

The process begins by cleaning and sanitizing whole coconuts. The coconut water is extracted and chilled to a temperature less than 5° C., preferably about 4° C. The coconut water is then pre-filtered using a series of two macro filters to remove debris such as coconut shells or husks. After the debris removal filtration process, the coconut water goes through a pre-filtration process and then through a final microfiltration process.

Macro Filtration Process

The macro filtration process utilizes two macro filters; the first filter has pores sized about 10 to 50 microns, preferably about 20 microns. The filtrate from the first macro filtration is then processed through a second macro filter having pores sized about 1 to 5 microns, preferably about 1 micron. The filtrate from the second macro filter is then chilled to a temperature of less than 5° C., preferably about 4° C. This filtrate is then processed through a pre-microfiltration process described below.

Pre-Microfiltration Process

In one embodiment, the pre-microfiltration process is as follows. The coconut water that was processed through the macro filtration process described above is heated to a temperature of about 50° C. to 100° C., 67-73° C., or 70-73° C. or more preferably 73° C. and then filtered through a first filter having pores ranging from 0.6-1.0 microns, preferably 0.8 microns. Preferably this first filter is a cross flow/tangential flow filter. The permeate (the coconut water that flows through the filter) is then run through a second filter (preferably a bus or "dead end" filter) having pores ranging from 0.4 to about 0.7 microns, preferably 0.45 microns. This filtered coconut water is then cooled to less than 5° C., preferably about 4° C. This coconut water can be held, if necessary for up to about 10 days before the final microfiltration process, as long as the coconut water is kept chilled at a temperature of less than 5° C., preferably about 4° C.

In another embodiment, the pre-microfiltration process that follows the macro filtration process is as follows. The coconut water that was processed through the macro filtration described above is heated to a temperature of about 50° C. to 100° C., 67-73° C., or 70-73° C. or more preferably 73° C., and then filtered through a filter having pores ranging from 0.45 to 0.8 microns, preferably 0.5 microns. Preferably this filter is a cross flow/tangential flow filter. This filtered coconut water is then cooled to less than 5° C., preferably about 4° C. This coconut water can be held, if necessary for up to about 10 days before the final microfiltration process, as long as the coconut water is kept chilled at a temperature of less than 5° C., preferably about 4° C.

Final Microfiltration Process

Then the filtered coconut water obtained from one of the two above described pre-micro filtration processes is processed through a final microfiltration process, which involves filtering the heated coconut water so that it is filtered when warmed. The coconut water is heated to a temperature of about 50° C. to 100° C., 67-73° C., or 70-73° C. or more preferably 73° C. and then is processed through two cartridge micro filters (preferably bus or "dead end filters"), arranged in series. Heating the coconut water to 73° C. provides the added benefit that it reduces the potential for heat resistant microbial growth on the filter surface, and therefore minimizes the risk of filter "grow through." These cartridge micro filters have a pore size of about 0.1 to about 1.0, preferably, 0.2 microns. By processing the coconut water through the micro-filters at the temperatures of 50° C. to 100° C., 67-73° C., or 70-73° C. or more preferably 73° C., the coconut water flavor remains and is not noticeably altered as is the case if cold filtration is utilized or long heat pasteurization methods are undertaken. The coconut water through this microfiltration process is held at the elevated temperatures (50° C. to 100° C., 67-73° C., or 70-73° C. or more preferably 73° C.) for about 1 to 2 minutes. This process removes bacteria, microbes and *C. botulinum* spores and yet retains the organoleptic properties of fresh coconut water.

After the coconut water is processed through the second micro filter, it is cooled to about a temperature of about 20-30° C., preferably 30° C. The coconut water is packaged into sterile bottles using aseptic filing and packaging lines, thereby ensuring that no *C. botulinum* spores are reintroduced.

The invention also provides for coconut water prepared by the methods described above.

Examples

End Product Evaluation

End Product Evaluation was conducted on three separate runs of minimum 3,000 units each. Filter-sterilized coconut water prepared by methods described herein was produced as a sterile fill of 480 ml into the 500-ml common round bottle. Results from these tests are reported in the Table below. Tests 1, 2, and 3 had respective numbers of 480-ml coconut water units of 3,864, 3,864, and 3,984 bottles each. All units were commercially sterile in Tests 1 and 3. Mold was recovered from one bottle in Test 2. A valve in the system was inadvertently left open during the test, possibly affecting the test. Taken together, a defect level of one out of 11,712 units was achieved. This defect level is acceptable for end-product evaluation testing conducted using the procedure described. The process, as measured with coconut water filter-processed under methods described herein, thus rendered the coconut water commercially sterile.

Results of Microbiological End-Product-Evaluation Tests

| Test Number | Result (Unsterile/Total) | pH | Streak (PCA Agar) |
|---|---|---|---|
| 1 | 0/3,864 | 1500/1500 Normal | 100/100 Negative |
| 2 | 1/3,864 | 1500/1500 Normal | 100/100 Negative |
| 3 | 0/3,984 | 1500/1500 Normal | 100/100 Negative |

The invention claimed is:

1. A method of preparing coconut water that removes *C. botulinum* spores and retains the flavor of natural unprocessed coconut water, the method comprising heating coconut water to a temperature of about 63° C. to about 73° C. for about 1 to 2 minutes while filtering through two micro filters in series having a pore size of about 0.2 microns to remove *C. botulinum* spores and retain coconut water flavor.

2. The method of claim 1 wherein the coconut water is heated to a temperature of about 73° C.

3. The method of claim 1 further comprising aseptically packaging the filtered coconut water into sterile containers.

4. The method of claim 3 wherein before the pre-micro-filtration process, the coconut water is subjected to a macro filtration process, the macro filtration process comprising:

filtering coconut water obtained from fresh coconuts through a first macro filter having pores sized about 10 to 50 microns to obtain a first macro coconut water filtrate;

filtering the first macro coconut water filtrate through a second macro filter having pores sized about 1 to 5 microns to obtain a second macro coconut water filtrate; and chilling the second macro coconut water filtrate to a temperature of less than 5° C.

5. The method of claim 1 wherein before heating the coconut water to a temperature of about 63° C. to about 73° C. while filtering through two micro filters in series, the coconut water is subjected to a pre-micro filtration process comprising:

filtering the coconut water through a first pre-micro filter having pores ranging from 0.6 to 2.0 microns to obtain a permeate;

filtering the permeate through a second pre-micro filter having pores ranging from 0.4 to about 0.7 microns; and cooling the coconut water to less than 5° C.

6. The method of claim 5 wherein before the pre-micro-filtration process, the coconut water is subjected to a macro filtration process, the macro filtration process comprising:

filtering coconut water obtained from fresh coconuts through a first macro filter having pores sized about 10 to 50 microns to obtain a first macro coconut water filtrate;

filtering the first macro coconut water filtrate through a second macro filter having pores sized about 1 to 5 microns to obtain a second macro coconut water filtrate; and chilling the second macro coconut water filtrate to a temperature of less than 5° C.

7. The method of claim 1 wherein before heating the coconut water to a temperature of about 63° C. to about 73° C. while filtering through two micro filters in series, the coconut water is subjected to a pre-micro filtration process comprising:

filtering the coconut water through a pre-micro filter having pores ranging from 0.45 to 0.8 microns; and cooling the coconut water to less than 5° C.

\* \* \* \* \*